Jan. 6, 1970  N. G. NIXON  3,488,431
EXPANDABLE ELECTRICAL CONDUCTOR AND METHOD OF MAKING THE SAME
Filed July 1, 1968
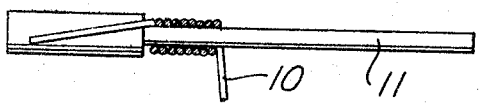
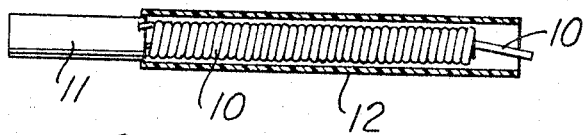
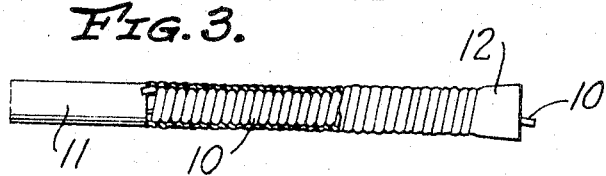
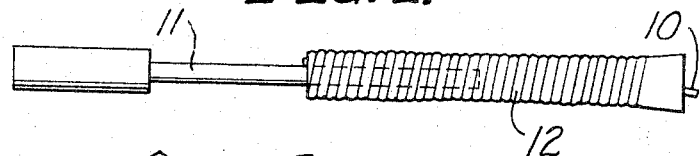
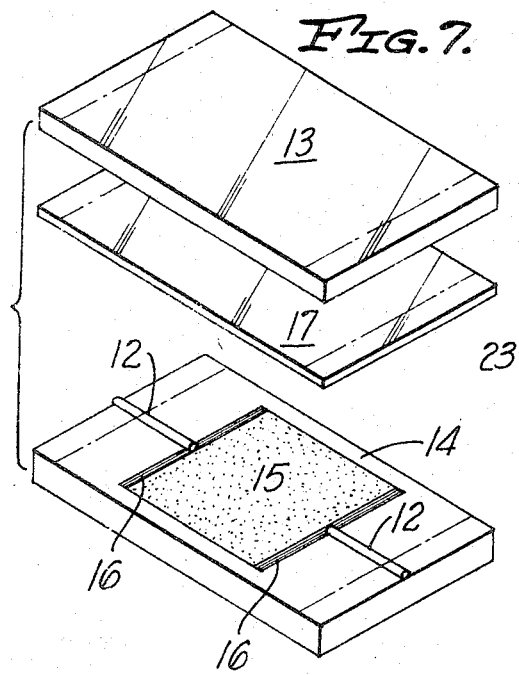
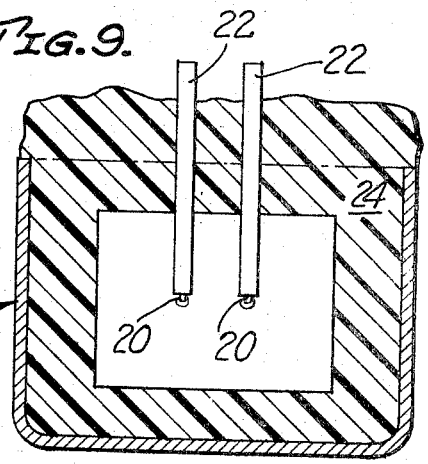
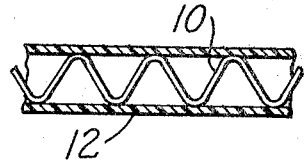
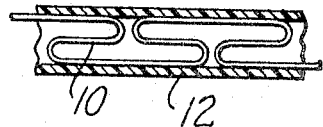
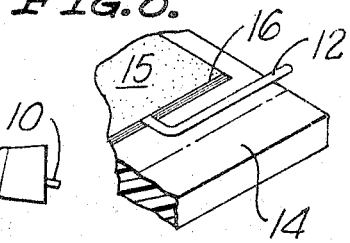
INVENTOR
NORMAN G. NIXON
BY
ROBERT C. COMSTOCK
ATTORNEY

United States Patent Office 3,488,431
Patented Jan. 6, 1970

3,488,431
EXPANDABLE ELECTRICAL CONDUCTOR AND METHOD OF MAKING THE SAME
Norman G. Nixon, Garden Grove, Calif., assignor to Swedlow Inc., Grove, Calif., a corporation of California
Filed July 1, 1968, Ser. No. 741,643
Int. Cl. H02g 3/04
U.S. Cl. 174—70      10 Claims

ABSTRACT OF THE DISCLOSURE

An expandable electrical conductor and method of making the same which is particularly adapted for use in electrically conductive laminated transparencies of the type used in aircraft and which is also capable of use with other articles as well. An elongated conductor such as a wire or the like is coiled, folded or otherwise compressed within an elongated tubular member or sleeve. In one embodiment of the invention, the conductor is wound around a mandrel, a plastic sleeve is heat shrunk around it and the mandrel is then withdrawn, leaving the conductor coiled within the sleeve. The inner end of the conductor makes an electrical connection within the article with which it is used. The sleeve is then laminated, molded or otherwise held within the article, with its outer end exposed. The portion of the article which holds the sleeve and conductor may be trimmed as desired. The outer end of the conductor may then be withdrawn from the sleeve a substantial distance beyond the outer periphery of the article and used to make an electrical connection.

BACKGROUND OF THE INVENTION

Field of the invention

Electrical conductors and particularly expandable electrical conductors for use in laminated aircraft transparencies and other devices.

Description of the prior art

The prior art known to the inventor comprises non-expandable conductors of various types which are molded or imbedded in articles, including some in which a connector member must be removed before the article is trimmed. The prior art devices all comprise relatively elaborate and complicated methods and structures for providing electrical connections after the article has been trimmed.

SUMMARY OF THE INVENTION

The invention provides a longitudinally expandable electrical conductor in which a relatively resilient electrical conductor element such as a wire, braid, strand, strip, foil or the like is coiled, wound, serpentined, folded, bent or otherwise compressed or reduced in overall length and held within an elongated tubular member or sleeve. In one embodiment of the invention, the conductor is wound or coiled around a mandrel and a plastic tube heat shrunk around the assembly. The mandrel is then withdrawn, leaving the conductor coiled within the sleeve. Although the sleeve may be securely imbedded or molded into the lamination or device with which it is used, the conductor remains free to move with respect to the sleeve, so that the outer end of the conductor may be withdrawn from the sleeve and expand longitudinally to the extent necessary to make the desired outside electrical connection.

It is accordingly among the objects of the present invention to provide an expandable electrical conductor and method of making the same having all of the benefits and advantages of the structure set forth above and described hereinafter in this specification.

Another object of the invention is to provide such a conductor in which the edge or other portion of the article in which the sleeve and conductor are enclosed or held may be trimmed and a substantial amount of the sleeve and conductor cut off, without adversely effecting the operation or usefulness of the conductor.

It is a further object of the invention to provide an expandable electrical conductor and method of making the same which is much simpler than the prior art in its structure and its use and in which no part of the conductor assembly need be removed before the trimming operation or reinstalled after the trimming operation.

It is also among the objects of the invention to provide an electrical conductor which is capable of expansion or differential elongation in use, without breaking the electrical connection at either end of the conductor. This is particularly important in installations where additional elongation or contraction occurs due to movement, vibration, expansion or contraction.

Still another object of the invention is to provide such a conductor which is readily available for use when required, but which is held within the article and thus protected from damage prior to its use.

The invention also comprises such other objects, advantages and capabilities as will later more fully appear and which are inherently possessed by the invention.

While there are shown in the accompanying drawings preferred embodiments of the invention, it should be understood that the same are susceptible of modification and change without departing from the spirit of the invention.

DESCRIPTION OF THE DRAWINGS

FIG. 1 is a side elevational view of a mandrel with a conductor partly wound thereon;

FIG. 2 is a side elevational view of a conductor fully wound on a mandrel with a surrounding sleeve shown in section before heat shrinking of the sleeve;

FIG. 3 is a side elevational view partly in section similar to FIG. 2, showing the sleeve heat shrunk around the conductor and mandrel;

FIG. 4 is a side elevational view showing the mandrel being withdrawn from the conductor and sleeve;

FIG. 5 is an enlarged side elevational view of an alternative embodiment of the invention in which a serpentine or corrugated conductor is disposed within a sleeve, with the sleeve shown in section;

FIG. 6 is a similar view of another alternative embodiment of the invention in which a conductor is folded in a series of spaced overlapping folds;

FIG. 7 is an exploded isometric view showing a pair of completed conductors in use in a laminated transparency before lamination and trimming, with the trim lines in phantom lines;

FIG. 8 is a partial isometric view showing a right angular sleeve in use on part of a laminated transparency;

FIG. 9 is a sectional view showing two conductors in use within a transformer prior to the trimming of the upper portion of the potting material along the phantom lines.

DESCRIPTION OF THE PREFERRED EMBODIMENT

A preferred embodiment which has been selected to illustrate the invention comprises an elongated electrical conductor 10, which may take the form of a solid wire, stranded wire, braided wire, metal strip, metal foil or any other suitable form. The conductor 10 is preferably wound around an elongated substantially rigid mandrel 11. An elongated tubular member or sleeve 12 is then mounted over the wound conductor 10 and mandrel 11.

The sleeve 12 may be rigid or may be somewhat resilient. Heat shrink plastic tubing has been found satisfactory, in which case the sleeve 12 is heat shrunk around the conductor 10 and mandrel 11. The mandrel 11 may then be withdrawn, leaving the wound conductor 10 within the sleeve 12.

The sleeve 12 is then imbedded, molded or otherwise held within the lamination or other device with which it is used. In the case of an electrically conductive laminated aircraft transparency, the lamination customarily comprises a pair of transparent inner and outer layers 13 and 14. The layer 14 is coated on its inner surface with an electrically conductive material 15 which is connected to a pair of bus bars 16, which extend along the edges of the layer 14.

The inner end of the conductor 12 is connected to one of the bus bars 16 and the sleeve 12 is oriented so that it extends from one of the bus bars 16 to the edge of the layer 14. The layers 13 and 14 are then laminated together with a plastic interlayer 17 disposed between them. The sleeve 12 is customarily imbedded within the interlayer 17 or sandwiched between it and the adjacent layer 14 during the lamination of the structure.

After the lamination has been completed, the outer edges of the laminated structure may be trimmed as desired, without any attention being paid to the sleeve 12 and conductor 10. After the trimming has been completed, the outer end of the conductor 10 may be withdrawn from the sleeve 12 with tweezers, fingers or otherwise and the desired outside electrical connection made. If the conductor 10 is tightly wound, it may be expanded to an overall length as much as several times greater than that of the sleeve 12.

It will be noted that the conductor 10 also has the ability to undergo differential elongation in either direction after the connection has been made, assuming that it has not been stretched to its maximum in making the connection. The conductor accordingly has the ability to undergo differential elongation in response to movement, vibration, expansion or contraction without breaking or otherwise adversely affecting the electrical connection.

It should be understood that the conductor 10 may be wound, coiled, folded or otherwise compressed without the use of the mandrel 11. It should also be noted that the sleeve 12 need not necessarily be heat shrinkable plastic material and that it may comprise any desired resilient, semi-resilient or rigid material of any suitable kind or nature whatsoever.

Instead of being wound, the conductor 10 may be formed into a serpentine or corrugated form, as shown in FIG. 5 of the drawings, in which case less elongation is provided. It may also be folded back upon itself in a series of looped folds, as shown in FIG. 6 of the drawings. In its crudest form, the conductor 10 may be randomly stuffed or compressed within the sleeve 12.

The sleeve 12 need not necessarily be straight before or after the insertion of the conductor 10. The sleeve 12 and conductor 10 may be right angular, as shown in FIG. 8, or it may be curved or assume any other suitable configuration.

Another application of the invention is shown in FIG. 9 of the drawings, in which a sleeve 22 and conductor 20 are shown imbedded in a transformer 23, in which the top of the transformer is filled with potting material 24 which is subsequently trimmed off, after which the outer end of the conductor 20 is withdrawn from the sleeve 22 and the desired electrical connection made.

It will be noted that the sleeve forms a protective shroud around the conductor which prevents the conductor from being held against movement by the material in which the sleeve is imbedded or held. The outer end of the conductor is accordingly free for differential elongation with respect to the sleeve and the article in which the sleeve is held both before and after the connection is made.

I claim:

1. The method of making an expandable electrical conductor for an article comprising longitudinally constricting an elongated electrical conductor within a sleeve, making an electrical connection to the inner end of said conductor within said article, mounting said sleeve within said article with the outer end of said sleeve exposed, withdrawing the outer end of said conductor from the exposed end of said sleeve and longitudinally expanding said conductor to make an electrical connection to said article.

2. The method described in claim 1, in which only the outer end of said sleeve is exposed along an outer edge of said article, and trimming said outer edge of said article, together with the outer end of said sleeve and conductor disposed therein before said outer electrical connection is made.

3. The method described in claim 1, in which said conductor is substantially resilient, and constricting said conductor within said sleeve by winding said conductor around a substantially rigid mandrel, inserting said mandrel and wound conductor into said sleeve, and withdrawing said mandrel to leave said conductor wound within said sleeve.

4. The method described in claim 3, in which said sleeve is formed of heat shrinkable plastic, and heat shrinking said sleeve around said conductor and mandrel before withdrawing said mandrel.

5. An expandable electrical conductor for an article comprising a longitudinally constricted elongated electrical conductor disposed within a sleeve, the inner end of said conductor making an electrical connection within said article, said sleeve being mounted within said article with its outer end exposed, the outer end of said conductor adapted to be withdrawn from the exposed outer end of said sleeve and said conductor elongated longitudinally to make an electrical connection to said article.

6. The structure described in claim 5, in which said conductor is substantially flexible and is coiled within said sleeve.

7. The structure described in claim 5, in which said conductor is folded within said sleeve in a series of spaced folds.

8. The structure described in claim 5, in which said sleeve is a plastic sleeve heat shrunk around said conductor.

9. The structure described in claim 5, said sleeve being imbedded within said article with only the outer end of said sleeve exposed along an outer edge of said article.

10. The structure described in claim 9, in which said sleeve is a plastic sleeve heat shrunk around said conductor.

References Cited

UNITED STATES PATENTS

| | | | |
|---|---|---|---|
| 2,628,996 | 2/1953 | Mayo | 336—192 XR |
| 3,227,802 | 1/1966 | Pressley | 174—69 XR |

DARRELL L. CLAY, Primary Examiner

U.S. Cl. X.R.

174—69, 52; 264—272; 336—192; 338—322